(12) United States Patent
Kaltenbach et al.

(10) Patent No.: US 12,441,171 B2
(45) Date of Patent: Oct. 14, 2025

(54) DRIVE UNIT FOR A VEHICLE

(71) Applicant: ZF Friedrichshafen AG, Friedrichshafen (DE)

(72) Inventors: Johannes Kaltenbach, Friedrichshafen (DE); Thomas Martin, Weissenberg (DE); Fabian Kutter, Kressbronn (DE); Johannes Glückler, Friedrichshafen (DE); Kai Borntrāger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/743,713

(22) Filed: Jun. 14, 2024

(65) Prior Publication Data

US 2024/0416747 A1   Dec. 19, 2024

(30) Foreign Application Priority Data

Jun. 16, 2023   (DE) ...................... 10 2023 205 679.8

(51) Int. Cl.
*B60K 1/00* (2006.01)
*F16H 37/08* (2006.01)

(52) U.S. Cl.
CPC .......... *B60K 1/00* (2013.01); *B60K 2001/001* (2013.01); *F16H 37/08* (2013.01);
(Continued)

(58) Field of Classification Search
CPC ................ B60K 1/00; B60K 2001/001; F16H 2200/0021; F16H 2200/2064;
(Continued)

(56) References Cited

U.S. PATENT DOCUMENTS 9,011,284 B2 *  4/2015  Ziemer .................. F16H 3/725
                                                    475/5
10,570,995 B2 *  2/2020  Beck ........................ B60K 6/48
(Continued)

FOREIGN PATENT DOCUMENTS

DE   10 2019 206 961 A1   11/2020
DE   10 2020 122 044 A1    2/2022

OTHER PUBLICATIONS

German Patent Office, German Search Report issued in German patent application No. 10 2023 205 679.8 (Mar. 14, 2024).
(Continued)

*Primary Examiner* — James J Taylor, II
(74) *Attorney, Agent, or Firm* — Finch & Maloney PLLC

(57) ABSTRACT

A drive unit for a vehicle includes an electric machine and a manual gearbox with at least a first shift element, a second shift element, a third shift element and two planetary gear sets coupled to one another and each having a sun shaft, a hollow gear shaft, and a web shaft. The second hollow gear shaft is connected rotationally fixed to the first web shaft. The first sun shaft is connected to a stationary component. In the respective actuated states, the first shift element locks the first planetary gear set to shift a first gear, the second shift element connects the first hollow gear shaft to the second web shaft to shift a second gear, and the third shift element connects the first hollow gear shaft to the second sun shaft to shift a third gear.

16 Claims, 7 Drawing Sheets

(52) U.S. Cl.
CPC ........... *F16H 2200/0021* (2013.01); *F16H 2200/0039* (2013.01); *F16H 2200/0043* (2013.01); *F16H 2200/2007* (2013.01); *F16H 2200/201* (2013.01); *F16H 2200/2094* (2013.01); *F16H 2200/2097* (2013.01)

(58) Field of Classification Search
CPC ..... F16H 2200/2094; F16H 2200/2033; F16H 2200/2097; F16H 2200/2007; F16H 2200/201; F16H 2200/0039; F16H 2200/0043; F16H 37/08–0826
See application file for complete search history.

(56) References Cited

U.S. PATENT DOCUMENTS

| | | |
|---|---|---|
| 10,753,431 B2 | 8/2020 | Beck et al. |
| 11,135,914 B2 * | 10/2021 | Glückler .............. B60K 17/046 |
| 11,353,091 B2 * | 6/2022 | Renner ................. F16H 3/663 |
| 2020/0384847 A1 | 12/2020 | Beck et al. |
| 2022/0009332 A1 | 1/2022 | Beck et al. |
| 2022/0065334 A1 * | 3/2022 | Martin ................... B60K 17/02 |
| 2022/0111718 A1 * | 4/2022 | Beck ....................... F16H 3/663 |
| 2023/0339315 A1 | 10/2023 | Engerman et al. |

OTHER PUBLICATIONS

German Patent Office, German Search Report issued in German patent application No. 10 2023 205 680.1 (Mar. 15, 2024).

\* cited by examiner

DRIVE UNIT FOR A VEHICLE

RELATED APPLICATIONS

This application claims the benefit of and right of priority under 35 U.S.C. § 119 to German Patent Application no. 10 2023 205 679.8, filed on 16 Jun. 2023, the contents of which are incorporated herein by reference in its entirety.

FIELD OF THE DISCLOSURE

The invention relates to a drive unit for a vehicle, wherein the drive unit comprises a single electric machine and a manual gearbox with a plurality of gears. Furthermore, the invention relates to a vehicle with such a drive unit.

BACKGROUND

For example, DE 10 2019 206 961 A1 discloses a drive unit for an electric vehicle, comprising an electric machine and a two-speed manual gearbox with a first shift element, a second shift element, and two planetary gear sets coupled to one another. The first planetary gear set comprises a first sun shaft, a first hollow gear shaft and a first web shaft. The second planetary gear set comprises a second sun shaft, a second hollow gear shaft, and a second web shaft. The first hollow gear shaft is permanently connected to the second web shaft. The first sun shaft is actuatable by the electric machine. The second sun shaft is fixed. The first web shaft forms the gear output shaft of the two-speed manual gearbox. The first shift element A can be actuated to shift the first gear. The second shift element can be actuated to shift the second gear.

SUMMARY

The task of the present invention is to provide an alternative drive unit for a vehicle, wherein the number of gears is to be increased. Furthermore, the drive unit is to be designed to be compact and energy-efficient in particular. The task is solved by a respective drive unit with the features disclosed herein. Advantageous embodiments will be apparent from the following description and the figures.

A drive unit for a vehicle according to the invention comprises an electric machine and a manual gearbox with at least a first shift element, a second shift element, a third shift element, and two planetary gear sets coupled to one another, wherein the first planetary gear set has a first sun shaft, a first hollow gear shaft, and a first web shaft, wherein the second planetary gear set has a second sun shaft, a second hollow gear shaft, and a second web shaft, wherein the second sun shaft is actuatable by the electric machine, in particular is connected to a drive shaft in a rotationally fixed manner, wherein the second web shaft is configured as the output of the manual gearbox, in particular connected to an output shaft in a rotationally fixed manner, wherein the second hollow gear shaft is connected to the first web shaft in a rotationally fixed manner, wherein the first sun shaft, in an actuated state, is connected to a stationary component in a rotationally fixed manner, wherein the first shift element connects the first hollow gear shaft to the first web shaft in a rotationally fixed manner, in order to shift a first gear, wherein the second shift element, in an actuated state, connects the first hollow gear shaft to the second web shaft in a rotationally fixed manner, in order to shift a second gear, wherein the third shift element, in an actuated state, connects the first hollow gear shaft to the second sun shaft in a rotationally fixed manner, in order to shift a third gear. Reference is made to the embodiment shown in FIG. 2.

A further drive unit for a vehicle according to the invention comprises an electric machine and a manual gearbox with at least a first shift element, a second shift element, a third shift element, and two planetary gear sets coupled to one another, wherein the first planetary gear set has a first sun shaft, a first hollow gear shaft, and a first web shaft, wherein the second planetary gear set has a second sun shaft, a second hollow gear shaft, and a second web shaft, wherein the second sun shaft is actuatable by the electric machine, in particular is connected to a drive shaft in a rotationally fixed manner, wherein the second web shaft is configured as the output of the manual gearbox, in particular connected to an output shaft in a rotationally fixed manner, wherein the second hollow gear shaft is connected to the first web shaft in a rotationally fixed manner, wherein the first sun shaft, in an actuated state, is connected to a stationary component in a rotationally fixed manner, wherein the first shift element, in an actuated state, connects the first hollow gear shaft to a stationary component in a rotationally fixed manner in order to shift a first gear, wherein the second shift element, in an actuated state, connects the first hollow gear shaft to the second web shaft in a rotationally fixed manner, in order to shift a second gear, wherein the third shift element, in an actuated state, connects the first hollow gear shaft to the second sun shaft in a rotationally fixed manner, in order to shift a third gear. Reference is made to the embodiment shown in FIG. 3.

A further drive unit for a vehicle according to the invention comprises an electric machine and a manual gearbox with at least a first shift element, a second shift element, a third shift element, a fourth shift element, and two planetary gear sets coupled to one another, wherein the first planetary gear set has a first sun shaft, a first hollow gear shaft, and a first web shaft, wherein the second planetary gear set has a second sun shaft, a second hollow gear shaft, and a second web shaft, wherein the second sun shaft is actuatable by the electric machine, in particular is connected to a drive shaft in a rotationally fixed manner, wherein the second web shaft is configured as the output of the manual gearbox, in particular connected to an output shaft in a rotationally fixed manner, wherein the second hollow gear shaft is connected to the first web shaft in a rotationally fixed manner, wherein the first sun shaft, in an actuated state, is connected to a stationary component in a rotationally fixed manner, wherein the first shift element, in an actuated state, connects the first hollow gear shaft to a stationary component in a rotationally fixed manner in order to shift a first gear, wherein the second shift element, in an actuated state, connects the first hollow gear shaft to the second web shaft in a rotationally fixed manner, in order to shift a second gear, wherein the third shift element, in an actuated state, connects the first hollow gear shaft to the second sun shaft in a rotationally fixed manner, in order to shift a third gear, wherein the fourth shift element, in an actuated state, connects the first web shaft to the second sun shaft in a rotationally fixed manner in order to shift a fourth gear. Reference is made to the embodiment shown in FIG. 4.

A further drive unit for a vehicle according to the invention comprises an electric machine and a manual gearbox with at least a first shift element, a second shift element, a third shift element, a fourth shift element, and two planetary gear sets coupled to one another, wherein the first planetary gear set has a first sun shaft, a first hollow gear shaft, and a first web shaft, wherein the second planetary gear set has a second sun shaft, a second hollow gear shaft and a second web shaft, wherein the second sun shaft is actuatable by the electric machine, in particular is connected to a drive shaft in a rotationally fixed manner, wherein the second web shaft is configured as the output of the manual gearbox, in particular connected to an output shaft in a rotationally fixed manner, wherein the second hollow gear shaft is connected to the first web shaft in a rotationally fixed manner, wherein the first sun shaft, in an actuated state, is connected to a stationary component in a rotationally fixed manner, wherein the first shift element, in an actuated state, connects the first hollow gear shaft to a stationary component in a rotationally fixed manner, wherein the second shift element, in an actuated state, connects the first hollow gear shaft to the second web shaft in a rotationally fixed manner, in order to shift a second gear, wherein the third shift element, in an actuated state, connects the first hollow gear shaft to the second sun shaft in a rotationally fixed manner, in order to shift a third gear, wherein the fourth shift element, in an actuated state, connects the second web shaft to the second sun shaft in a rotationally fixed manner in order to shift a fourth gear. Reference is made to the embodiment shown in FIG. 10.

The manual gearbox enables the connection of a single electric machine to initiate drive power via the drive shaft. The manual gearbox is connected to a differential or a vehicle wheel via the output shaft with an actuating effect. The manual gearbox is actuated via the second sun shaft, wherein the output is via the second web shaft. The second sun shaft is connected to the electric machine with an actuating effect. The second web shaft is connected to at least one vehicle wheel with an actuating effect. For example, a single drive unit is used in an electric drive axle for an electric vehicle, wherein the output shaft is then connected to a differential with an actuating effect. Alternatively, two drive units can be used in an electric drive axle for an electric vehicle, wherein the respective output shaft is then connected to the respective vehicle wheel of the drive axle with an actuating effect. The manual gearbox has three or four gears that are shifted by means of the shift elements, creating high energy efficiency for electric vehicles.

The first shift element can be actuated to shift the first gear. The second shift element can be actuated to shift the second gear. The third shift element can be actuated to shift the third gear. The fourth shift element can be actuated to shift the fourth gear.

A "shift element" is a shiftable device which, in a closed state, connects two shafts or a shaft and a stationary component in a rotationally fixed manner and, in an open state, decouples the two shafts or the shaft and the stationary component from one another. Two shafts can then rotate relative to one another. A "stationary component" is a component that is fixed in a stationary position, in particular is connected to a part of a housing in a rotationally fixed or integral manner. The shift elements are configured as gear shift elements and are thus configured for shifting gears.

For the purposes of the invention, a "shaft" is to be understood as a rotatable component of the transmission, via which associated components of the transmission are connected to each other in a rotationally fixed manner or via which such a connection can be made when one of the shift elements is actuated. The respective shaft can connect the components to one another axially or radially or even both axially and radially. The respective shaft can therefore also be present as an intermediate element by which a respective component is connected, for example, radially. The term "shaft" does not exclude the possibility that the components to be connected may be designed in one piece. In particular, two or more shafts connected to each other in a rotationally fixed manner can be designed in one piece.

According to a preferred embodiment, all shift elements are designed as interlocking shift elements. For example, an interlocking shift element is designed as a claw clutch. Interlocking shift elements can increase the efficiency of the drive unit due to reduced drag losses. In particular, interlocking shift elements are more compact and optimized in terms of efficiency and have a cost advantage over frictionally engaged shift elements.

According to a preferred embodiment, the first shift element, the second shift element, and the third shift element are combined to form a shift unit with five shift positions, wherein the shift unit has a single axially movable sliding sleeve. The sliding sleeve is axially movable into the respective shift position by means of a single actuator. Preferably, the sliding sleeve is arranged in a rotationally fixed manner on the first hollow gear shaft in all five shift positions. Preferably, the shift unit has a neutral position between two gear positions, so that three gear positions and two neutral positions are provided for five shift positions. In a neutral position, two shafts are decoupled from one another via the shift unit.

According to a preferred embodiment, the first shift element, the second shift element, the third shift element, and the fourth shift element form a shift unit with seven shift positions, wherein the shift unit has a single axially movable sliding sleeve. The sliding sleeve is axially movable into the respective shift position by means of a single actuator. Preferably, the shift unit has a neutral position between two gear positions, so that four gear positions and three neutral positions are provided for seven shift positions.

In particular, a single actuator moves the sliding sleeve into the respective shift position, thereby shifting up to four gears sequentially. Preferably, the sliding sleeve has interlocking claws which, in the respective gear position, interact positively with a respective corresponding claw toothing in order to set a rotationally fixed connection between two shafts or a shaft and the housing. The respective claw toothing, with which the sliding sleeve interacts in an interlocking manner, is therefore to be understood as a shift element. In particular, the sliding sleeve is arranged axially between two gear positions in a respective neutral position, so that a change between the gears always requires a passage through a neutral position. Preferably, the shift unit comprises an unsynchronized claw clutch.

According to a preferred embodiment, the shift unit is arranged at least partially or completely radially within the electric machine. In other words, the shift unit is arranged at least partially or completely axially overlapping with the electric machine. For example, the shift unit protrudes at least partially or completely axially into the electric machine. This makes the drive unit more compact, particularly in the axial direction.

According to a preferred embodiment, the drive unit further comprises a differential with a differential input shaft, which is at least indirectly connected to the second web shaft and two differential output shafts.

For example, the differential is designed as a bevel gear differential. A differential designed as a bevel gear differential has two output elements on the wheel side, in particular a first output gear and a second output gear. The two output gears each mesh with a balancing element. The balancing elements are mounted in a differential cage so that they can rotate about their own axis. The respective output gear is connected to the respective differential output shaft in a rotationally fixed manner. The differential is driven via the differential cage, which is configured as a differential input shaft. The drive power fed into the differential gear is distributed to the differential output shafts and transmitted to the drive gears of the axle. The differential output shafts are configured to be connected to the drive gears of the vehicle with an actuating effect. The respective differential output shaft can be connected directly or directly or indirectly or indirectly via a joint, a joint shaft and/or a wheel hub to the associated vehicle wheel.

For example, the differential is designed as an integral differential with a first planetary gear set and a second planetary gear set. An "integral differential" is a differential with a first planetary gear set and a second planetary gear set that is operatively connected to the first planetary gear set. The first planetary gear set of the integral differential is connected with actuating effect to the output shaft of the manual gearbox, in particular to the second web shaft, and is also connected with actuating effect to the second planetary gear set of the integral differential and at least indirectly to the first differential output shaft. The second planetary gear set of the integral differential is also connected to the second differential output shaft with an actuating effect and is supported on a stationary component, in particular on a housing component. By means of such an integral differential, the input torque, which is introduced into the integral differential, can be converted and distributed to the two differential output shafts in a defined ratio. In particular, half of the input torque is transferred to the two differential output shafts.

According to a preferred embodiment, the drive unit further comprises a third planetary gear set designed as a constant transmission stage with a third sun shaft, a third hollow gear shaft, and a third web shaft. For example, the third sun shaft is connected to the second web shaft in a rotationally fixed manner, wherein the output shaft is connected to the third web shaft in a rotationally fixed manner, wherein the hollow gear shaft is connected to the stationary component in a rotationally fixed manner. Multiple planetary gears are rotatably mounted on the third web shaft and engage in tooth mesh with the third sun shaft and the third hollow gear shaft.

According to a preferred embodiment, the third planetary gear set is arranged at least partially or completely radially within the electric machine. In other words, the third planetary gear set is arranged at least partially or completely axially overlapping with the electric machine. For example, the third planetary gear set protrudes at least partially or completely axially into the electric machine. This makes the drive unit more compact, particularly in the axial direction.

According to a preferred embodiment, the first planetary gear set and the second planetary gear set are arranged axially adjacent to one another. Preferably, the first planetary gear set is arranged axially between the second and third planetary gear sets. Consequently, there are no other components axially between the respective planetary gear sets.

According to a preferred embodiment, the electric machine is arranged at a first axial end section of the manual gearbox, wherein the output shaft is arranged at a second axial end section of the manual gearbox formed in the opposite direction. This means that the electric machine and the output shaft are spaced as far apart as possible in the axial direction. Alternatively, the electric machine is arranged at a first axial end section of the manual gearbox, wherein the output shaft is guided axially through the electric machine and is also arranged at the first axial end section of the manual gearbox. Consequently, the drive shaft, which is connected to the rotor of the electric machine in a rotationally fixed manner, for example, is designed as a hollow shaft and is configured for axial passage of the output shaft.

A vehicle according to the invention comprises at least one drive unit according to the invention. The above definitions and explanations of technical effects, advantages, and advantageous embodiments of the drive unit according to the invention also apply mutatis mutandis to the vehicle according to the invention.

BRIEF DESCRIPTION OF THE DRAWINGS

Advantageous embodiments of the invention, which are explained below, are shown in the drawings, wherein identical or similar elements are provided with the same reference numerals. The following are shown.

DETAILED DESCRIPTION

Figure 1:
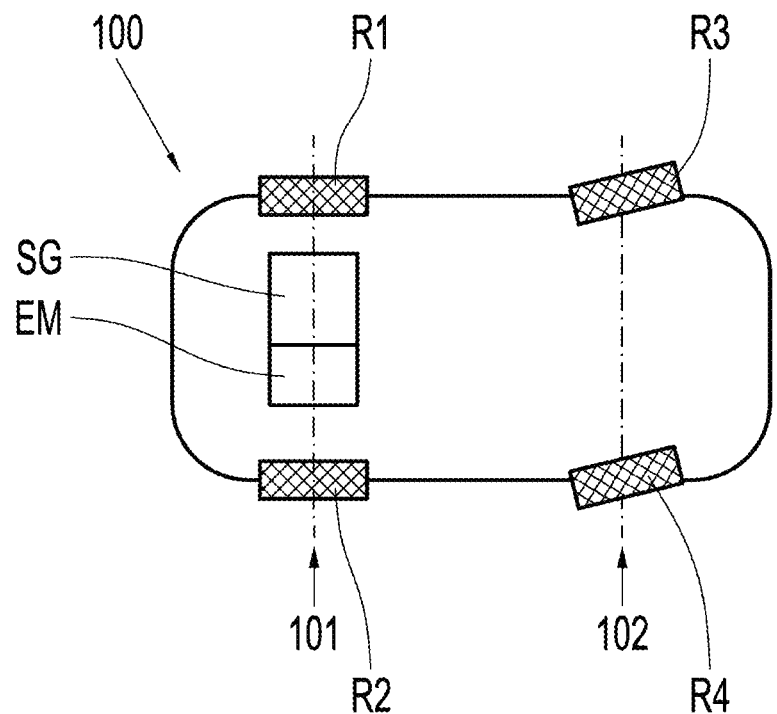
FIG. 1: a highly abstract schematic view of a vehicle with a drive axle, which has a drive unit according to the invention.

FIG. 1 shows a vehicle 100 with a first axle 101 with two vehicle wheels R1, R2 and a second axle 102 with two vehicle wheels R3, R4. In the present case, the first axle 101 is designed as the rear drive axle of the vehicle 100 and is equipped with a drive unit according to the invention. The drive unit comprises an electric machine EM, which is set up to generate drive power, and a manual gearbox SG with several gears. The vehicle 100 is therefore designed as an electric vehicle, i.e., a vehicle that can be driven electrically. The drive unit is arranged transversely to the longitudinal direction of the vehicle and is connected to the vehicle wheels R1, R2 of the first axle 101 with an actuating effect. In the present case, no further drive unit is arranged on the second axle 102, i.e., on the front axle of the motor vehicle 100, which saves costs, weight, and installation space.

Alternatively, the drive unit can be arranged on the front axle of the motor vehicle 100 instead of on the rear axle. To implement an all-wheel drive system, a further drive unit can be arranged on the second axle 102 and connected to the vehicle wheels R3, R4 of this axle 102 with an actuating effect.

Figure 2:
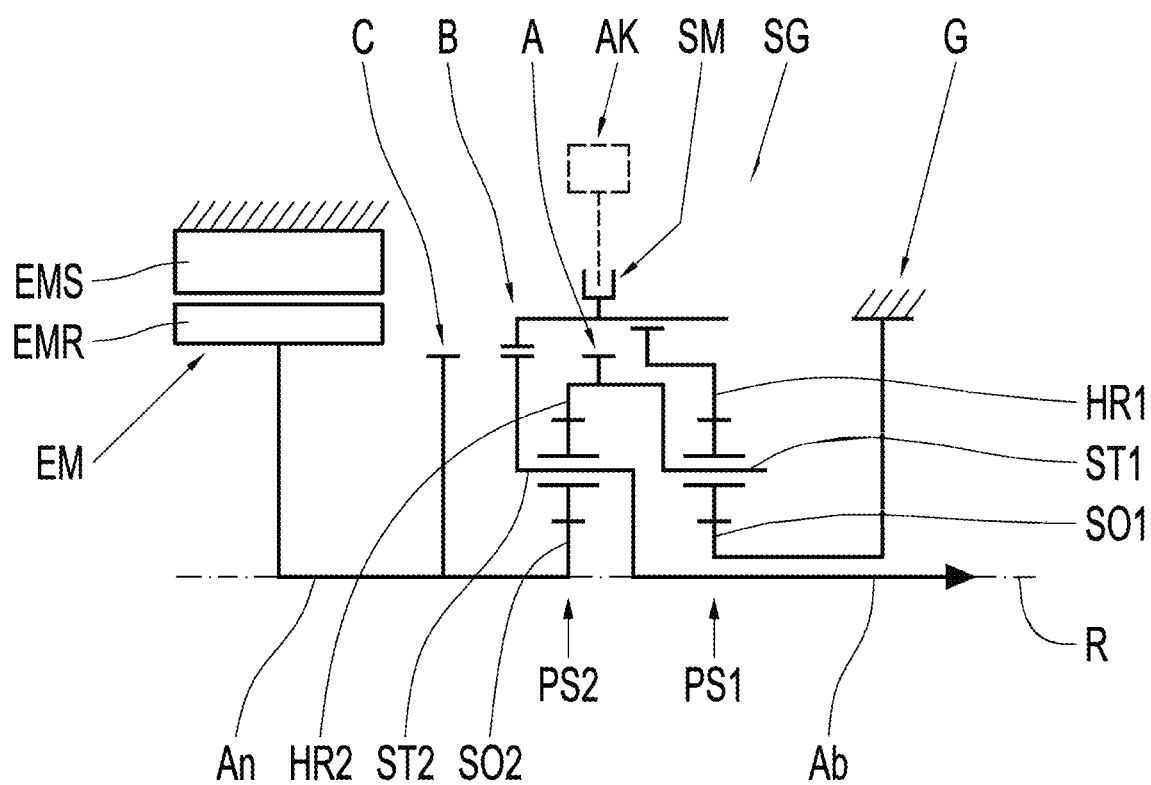
FIG. 2: a highly abstract schematic view of a drive unit according to the invention in accordance with a first embodiment.

According to FIG. 2, the drive unit comprises an electric machine EM with a stator EMS fixed to the housing and a rotatable rotor EMR as well as a manual gearbox SG with a first shift element A, a second shift element B, a third shift element C, and two planetary gear sets PS1, PS2 coupled to one another. All three shift elements A, B, C are designed as interlocking shift elements, which saves installation space and increases efficiency. The first planetary gear set PS1 comprises three shafts, namely a first sun shaft SO1, a first hollow gear shaft HR1, and a first web shaft ST1. The first web shaft ST1 carries multiple planetary gears that mesh with the first sun shaft SO1 and with the first hollow gear shaft HR1, i.e., engage in a tooth mesh. The second planetary gear set PS2 also comprises three shafts, namely a second sun shaft SO2, a second hollow gear shaft HR2, and a second web shaft ST2. The second web shaft ST2 carries multiple planetary gears that mesh with the second sun shaft SO2 and the second hollow gear shaft HR2, i.e., engage in a tooth mesh. Furthermore, the two planetary gear sets PS1, PS2 are arranged axially adjacent to each other.

The second sun shaft SO2 is connected to the rotor EMR of the electric machine EM in a rotationally fixed manner via a drive shaft An and is thus actuatable by the electric machine EM. The second web shaft ST2 is configured as the output of the manual gearbox SG and is connected to an output shaft Ab in a rotationally fixed manner. The drive shaft An is arranged on one side of the drive unit and the output shaft Ab is arranged on an opposite side of the drive unit, wherein the drive shaft An and the output shaft Ab do not axially overlap each other. The output shaft Ab can be connected indirectly, for example, via a differential, or directly to at least one drive gear of the vehicle with an actuating effect. For example, a drive device can be provided for each drive gear of the vehicle.

The second hollow gear shaft HR2 is connected to the first web shaft ST1 in a rotationally fixed manner. In particular, the second hollow gear shaft HR2 and the first web shaft ST1 form a coupling shaft between the two planetary gear sets PS1, PS2. The first sun shaft SO1 is connected to a stationary component designed as the housing G of the drive device in a rotationally fixed manner. Consequently, the first sun shaft SO1 is stationary and thus prevented from rotating. The drive unit has a rotational axis of symmetry R, which coincides with the drive shaft An and the output shaft Ab. The electric machine EM and the manual gearbox SG are arranged coaxially to the drive shaft An and the output shaft Ab and thus rotate about the axis of symmetry R. FIG. 2 to FIG. 10 show only the "upper" half of the drive unit, wherein the "lower" half, which is not shown, is symmetrical to the "upper" half.

The first shift element A, the second shift element B and the third shift element C are combined to form a shift unit with five shift positions, wherein the shift unit has a single axially movable sliding sleeve SM, with which the five shift positions are realized. The sliding sleeve SM is arranged on the first hollow gear shaft HR1 in a rotationally fixed manner and is axially movable into the respective shift position by means of a single actuator AK. Consequently, all five shift positions of the shift unit are arranged linearly and consist of three gear positions and two neutral positions, wherein the shift unit has exactly one neutral position between two gear positions. Gears one to three are therefore shifted one after the other or sequentially by moving the sliding sleeve SM in an axial direction, in each case via neutral positions. This not only saves weight and components, but also costs, installation space and assembly work.

First gear is engaged when the sliding sleeve SM is in a first gear position, i.e., in a first shift position. In an actuated state, i.e., in the first shift position of the sliding sleeve SM, the first shift element A connects the first hollow gear shaft HR1 with the first web shaft ST1 in order to shift the first gear. This fixes the first planetary gear set PS1.

The first gear is selected by moving the sliding sleeve SM axially into a first neutral position, i.e., into a second shift position. In the second shift position of the sliding sleeve SM, the first hollow gear shaft HR1 and the first web shaft ST1 have no rotationally fixed connection to each other via the sliding sleeve SM and are thus decoupled from one another via the sliding sleeve SM. In the first neutral position, the sliding sleeve SM is only in rotary engagement with the first hollow gear shaft HR1.

The second gear is engaged by moving the sliding sleeve SM axially into a second gear position, i.e., into a third shift position. In an actuated state, i.e., in the third shift position of the sliding sleeve SM, the second shift element B connects the first hollow gear shaft HR1 with the second web shaft ST2 in order to shift to second gear. This slows down the rotational speed of the first hollow gear shaft HR1. This third shift position of the sliding sleeve SM is shown in FIG. 2.

The second gear is selected by moving the sliding sleeve SM axially into a second neutral position, i.e., into the fourth shift position. In the fourth shift position of the sliding sleeve SM, the first hollow gear shaft HR1 and the second web shaft ST2 have no rotationally fixed connection to each other via the sliding sleeve SM and are therefore decoupled from one another via the sliding sleeve SM. In the second neutral position, the sliding sleeve SM is only in rotary engagement with the first hollow gear shaft HR1.

The third gear is engaged by moving the sliding sleeve SM axially into a third gear position, i.e., into a fifth shift position. In an actuated state, i.e., in the fifth shift position of the sliding sleeve SM, the third shift element C connects the first hollow gear shaft HR1 to the second sun shaft SO2 in order to shift to third gear. As a result, the first hollow gear shaft HR1 rotates at the drive speed that was introduced to the drive shaft An by the electric machine EM.

Figure 3:
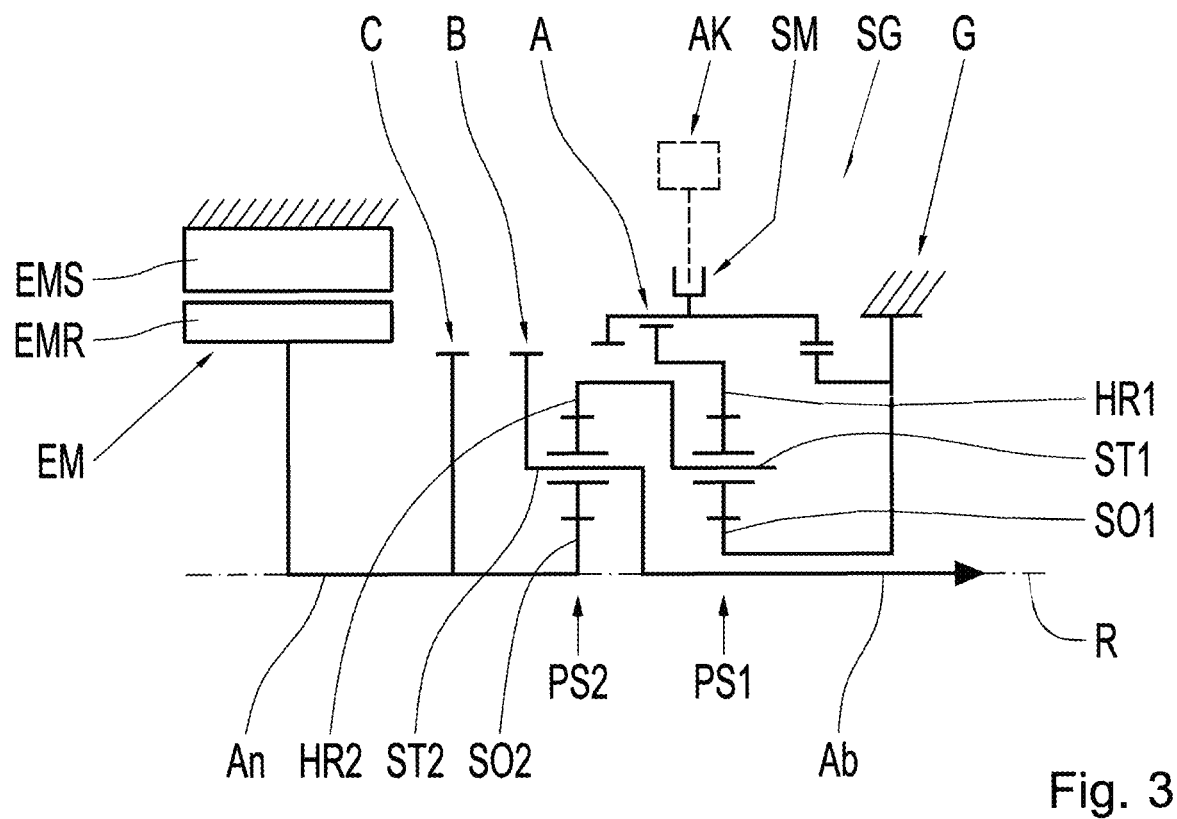
FIG. 3: a highly abstract schematic view of a drive unit according to the invention according to a second embodiment.

FIG. 3 shows a second embodiment of a drive unit according to the invention. The drive unit according to FIG. 3 essentially corresponds to the drive unit according to FIG. 2, wherein there is a difference between these two embodiments in the representation or realization of the first gear. This embodiment represents a locking variant for the first planetary gear set PS1. In order to shift a first gear, the first shift element A connects the first hollow gear shaft HR1 to the stationary component in the form of a housing G in an actuated state. Consequently, the first hollow gear shaft HR1 is fixed in a stationary position. Shift positions two to five and the function remain unchanged compared to the embodiment shown in FIG. 2. The first shift position of the sliding sleeve SM is shown in FIG. 3. A further locking variant for the first planetary gear set PS1, which is not shown in the figure, can be achieved by the first shift element A connecting the first web shaft ST1 to the housing G in a rotationally fixed manner. However, this locking variant does not allow a sliding sleeve SM, which is always connected to the first hollow gear shaft HR1. Otherwise, the exemplary embodiment according to FIG. 3 corresponds to the exemplary embodiment according to FIG. 2, to which reference is made.

Figure 4:
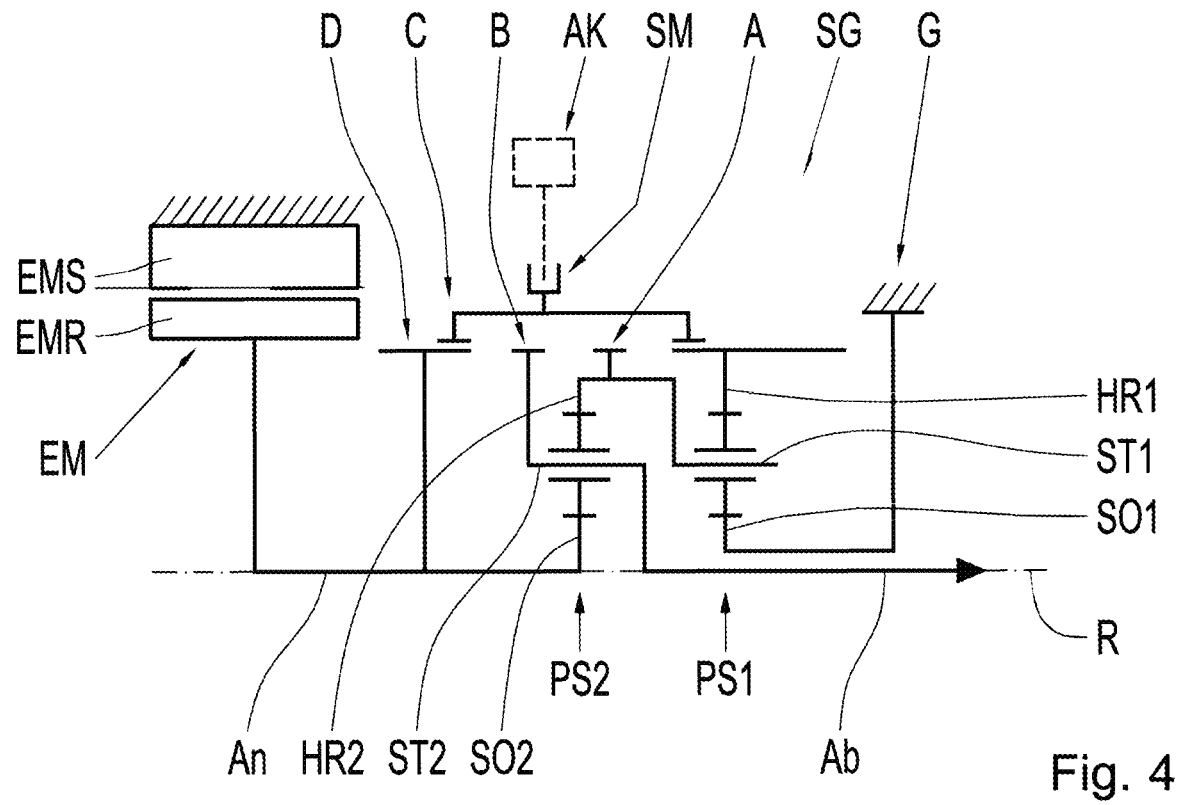
FIG. 4: a highly abstract schematic view of a drive unit according to the invention in accordance with a third embodiment.

FIG. 4 shows a third embodiment of a drive unit according to the invention. The drive unit according to FIG. 4 essentially corresponds to the drive unit according to FIG. 2, wherein one difference between these two embodiments is the arrangement of a further shift element to form a fourth gear. In the present case, the manual gearbox SG has not only the first, second and third shift elements A, B, C, but also a fourth shift element D. All four shift elements A, B, C, D are designed as interlocking shift elements. The first shift element A, the second shift element B, the third shift element C, and the fourth shift element D form a shift unit with seven shift positions, wherein the shift unit has a single axially movable sliding sleeve SM, with which the seven shift positions are realized. The sliding sleeve SM is axially movable into the respective shift position by means of a single actuator AK. Consequently, the seven shift positions of the shift unit are arranged linearly and are composed of four gear positions and three neutral positions, wherein the shift unit has exactly one neutral position between two gear positions. Gears one to four are therefore shifted one after the other or sequentially by moving the sliding sleeve SM in an axial direction, in each case via neutral positions. This not only saves weight and components, but also costs, installation space, and assembly work. Shift positions one to five and the function remain unchanged compared to the embodiment shown in FIG. 2. The fifth shift position of the sliding sleeve SM is shown in FIG. 4.

The third gear is selected by moving the sliding sleeve SM axially into a third neutral position, i.e., into the sixth shift position. In the sixth shift position of the sliding sleeve SM, the first hollow gear shaft HR1 and the second sun shaft SO2 have no rotationally fixed connection to each other via the sliding sleeve SM and are thus decoupled from one another via the sliding sleeve SM. In the third neutral position, the sliding sleeve SM is only in rotary engagement with the second sun shaft SO2.

Fourth gear is engaged by moving the sliding sleeve SM axially into a fourth gear position, i.e., into a seventh shift position. In an actuated state, i.e., in the seventh shift position of the sliding sleeve SM, the fourth shift element D connects the first web shaft ST1 to the second sun shaft SO2. This blocks the second planetary gear set PS2 and creates a direct gear with the transmission ratio 1, which is connected to the transmission ratio series. Otherwise, the exemplary embodiment according to FIG. 4 corresponds to the exemplary embodiment according to FIG. 2, to which reference is made.

Figure 5:
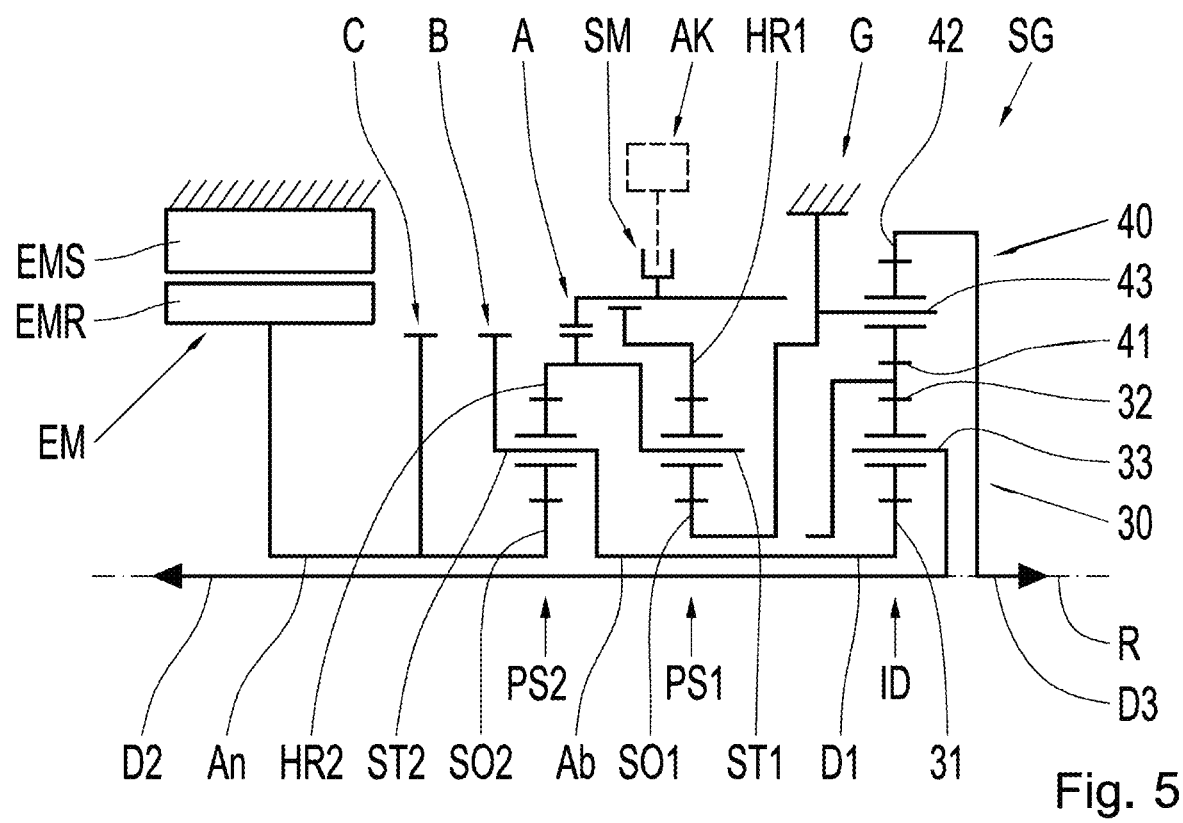
FIG. 5: a highly abstract schematic view of a drive unit according to the invention according to a fourth embodiment.

FIG. 5 shows a fourth embodiment of a drive unit according to the invention. The drive unit according to FIG. 5 essentially corresponds to the drive unit according to FIG. 2, wherein one difference between these two embodiments is the arrangement of a differential ID on the axis of symmetry R. The differential ID is designed as an integral differential with a first planetary gear set 30 and a second planetary gear set 40. The integral differential increases the final transmission ratio and at the same time enables a differential function. Alternatively, the differential can also be designed differently, for example as a ball differential or bevel gear differential.

The two planetary gear sets 30, 40 of the integral differential can be arranged either axially next to one another or radially on top of each other, i.e., radially stacked, depending on the requirements of the integral differential, in particular on the transmission ratio of the integral differential to be realized. In the present case, the two planetary gear sets 30, 40 of the integral differential are arranged radially one above the other, which saves axial installation space. A sun gear 31 of the first planetary gear set 30 of the integral differential is designed as differential input shaft D1 of the integral differential and is connected to the output shaft Ab in a rotationally fixed manner.

The output on the integral differential takes place via the two differential output shafts D2, D3, wherein a web shaft 33 of the first planetary gear set 30 of the integral differential is connected to the first differential output shaft D2 in a rotationally fixed manner, wherein a ring gear 42 of the second planetary gear set 40 of the integral differential is connected to the second differential output shaft D3 in a rotationally fixed manner. The sun gear 41 of the second planetary gear set 40 of the integral differential is rotationally fixed to the ring gear 32 of the first planetary gear set 30 of the integral differential and is designed as an intermediate gear with internal gearing and external gearing. The web shaft 43 of the second planetary gear set 40 of the integral differential carries multiple planetary gears, which mesh with the sun gear 41 and the ring gear 42, and is connected to the housing G in a rotationally fixed manner. Furthermore, the web shaft 33 of the first planetary gear set 30 of the integral differential carries multiple planetary gears which mesh with the sun gear 31 and the ring gear 32.

Using the first planetary gear set 30 of the integral differential, a first output torque can be transmitted to the first differential output shaft D1. A supporting torque of the first planetary gear set 30 acting in the opposite direction to the first output torque is transmitted to the second planetary gear set 40 and is convertible in the second planetary gear set 40 such that a second output torque corresponding to the first output torque can be transmitted to the second differential output shaft D2. In other words, a drive power fed in via the sun gear 31 of the first planetary gear set 30 is divided between the two differential output shafts D2, D3 by means of the integral differential. In the present case, the first differential output shaft D1 extends through the manual gearbox SG and the electric machine EM. The second differential output shaft D3 extends away from the electric machine EM in the opposite direction. Otherwise, the exemplary embodiment according to FIG. 5 corresponds to the exemplary embodiment according to FIG. 2, to which reference is made.

Figure 6:
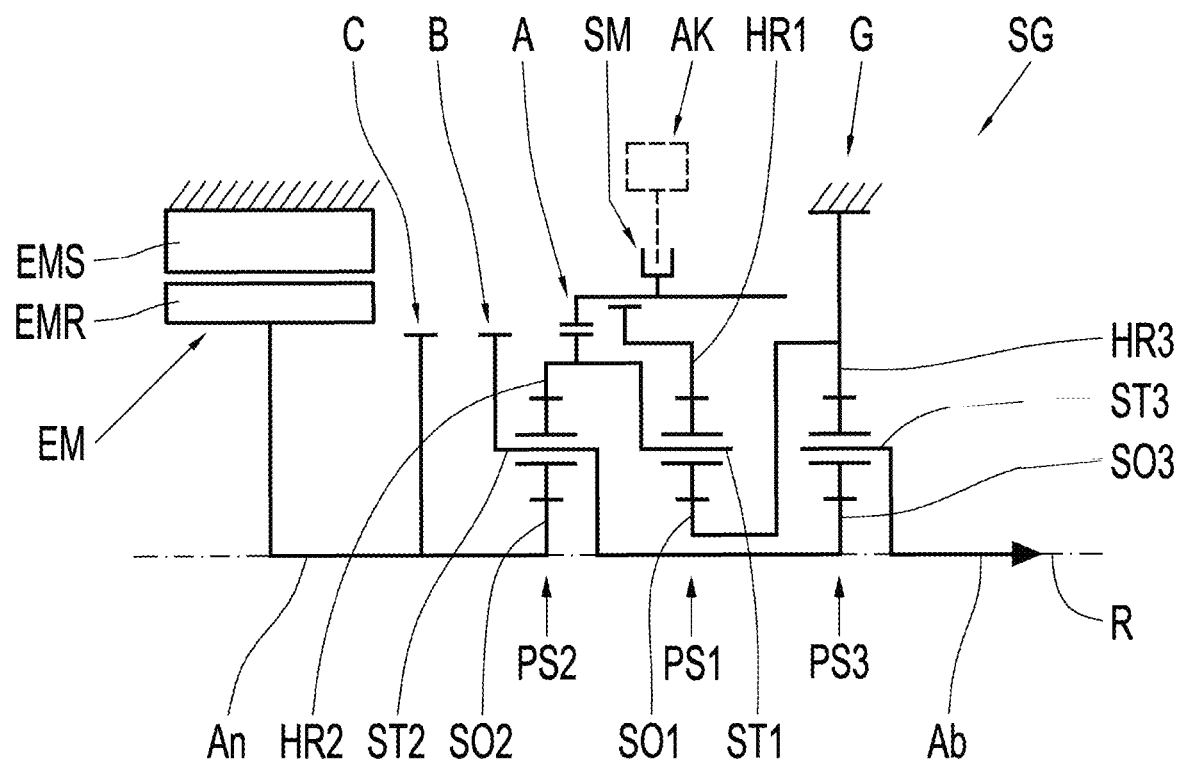
FIG. 6: a highly abstract schematic view of a drive unit according to the invention according to a fifth embodiment.

FIG. 6 shows a fifth embodiment of a drive unit according to the invention. The drive unit according to FIG. 6 essentially corresponds to the drive unit according to FIG. 2, wherein one difference between these two embodiments is the arrangement of a constant transmission stage. The constant transmission stage is designed as a third planetary gear set PS3 and comprises a third sun shaft SO3, a third hollow gear shaft HR3 and a third web shaft ST3. The third web shaft ST3 carries multiple planetary gears which mesh with the third sun shaft SO3 and with the third hollow gear shaft HR3. The third hollow gear shaft HR3 is connected to a stationary component in the form of a housing G in a rotationally fixed manner and is thus prevented from rotating. The third sun shaft SO3 is connected to the second web shaft ST2 in a rotationally fixed manner, wherein the third web shaft ST3 is connected to the output shaft Ab in a rotationally fixed manner. Consequently, the third planetary gear set PS3 is designed as a downshift gear set and is arranged in the power flow between the second web shaft ST2 and the output shaft Ab in order to increase the final transmission ratio of the manual gearbox SG. Otherwise, the exemplary embodiment according to FIG. 6 corresponds to the exemplary embodiment according to FIG. 2, to which reference is made.

Figure 7:
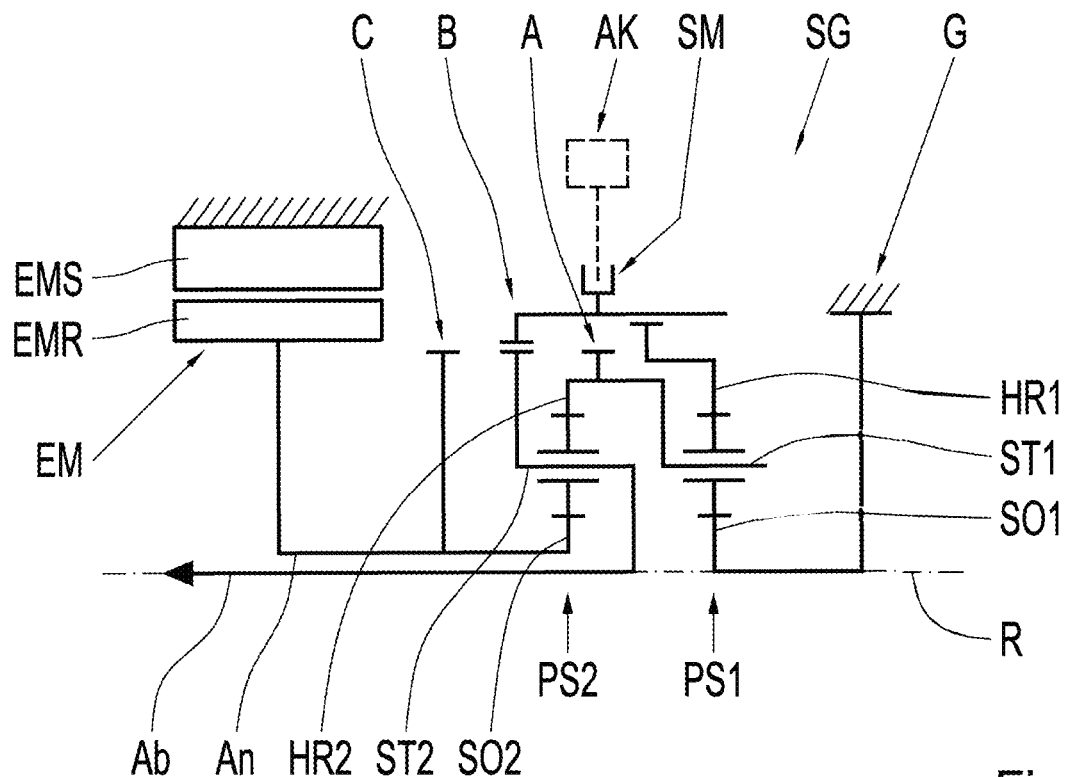
FIG. 7: a highly abstract schematic view of a drive unit according to the invention according to a sixth embodiment.

FIG. 7 shows a sixth embodiment of a drive unit according to the invention. The drive unit according to FIG. 7 essentially corresponds to the drive unit according to FIG. 2, wherein there is a difference between these two embodiments in the arrangement or orientation of the output shaft Ab. In the present case, the output shaft Ab is axially guided by the drive shaft An, which is designed as a hollow shaft, and the electric machine EM. In other words, the drive and the output of the manual gearbox SG are on the same side and not on opposite sides. Otherwise, the exemplary embodiment according to FIG. 7 corresponds to the exemplary embodiment according to FIG. 2, to which reference is made.

Figure 8:
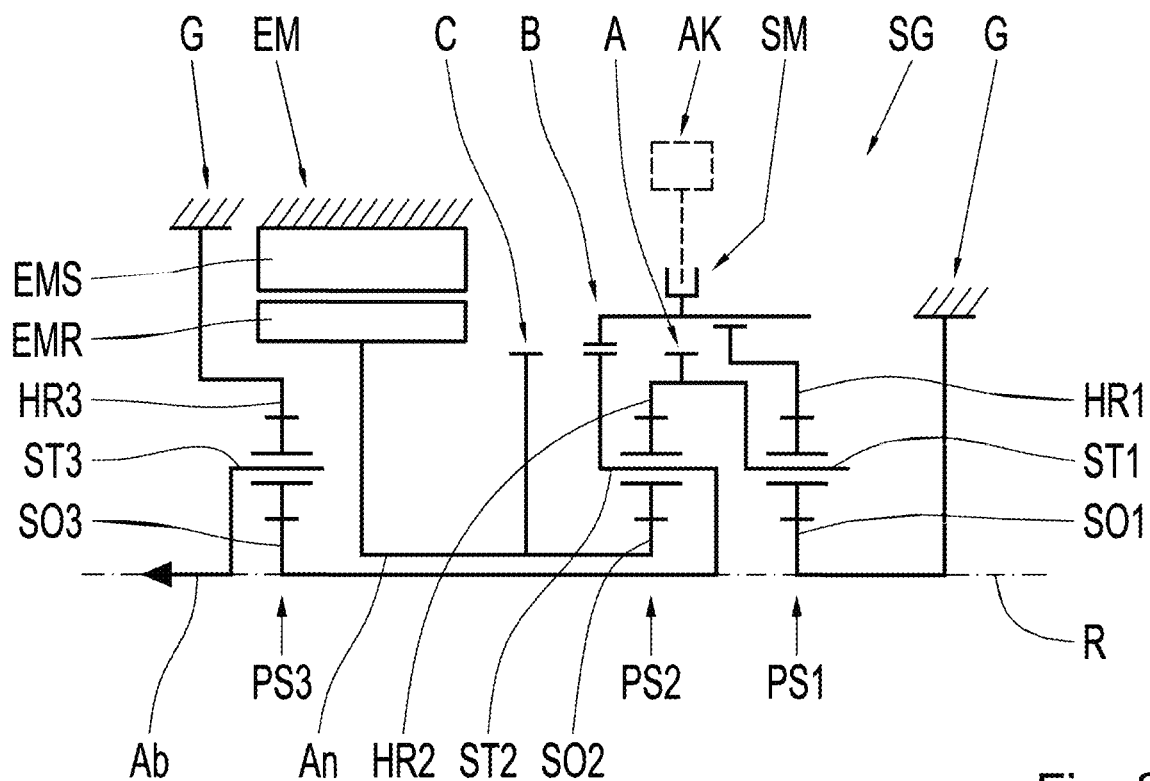
FIG. 8: a highly abstract schematic view of a drive unit according to the invention according to a seventh embodiment.

FIG. 8 shows a seventh embodiment of a drive unit according to the invention. The drive unit according to FIG. 8 essentially corresponds to the drive unit according to FIG. 7, wherein one difference between these two embodiments is the arrangement of a constant transmission stage. The constant transmission stage is designed as a third planetary gear set PS3 and comprises a third sun shaft SO3, a third hollow gear shaft HR3 and a third web shaft ST3. The third web shaft ST3 carries multiple planetary gears which mesh with the third sun shaft SO3 and with the third hollow gear shaft HR3. The third hollow gear shaft HR3 is connected to a stationary component in the form of a housing G in a rotationally fixed manner and is thus prevented from rotating. The third sun shaft SO3 is connected to the second web shaft ST2 in a rotationally fixed manner, wherein the third web shaft ST3 is connected to the output shaft Ab in a rotationally fixed manner. Consequently, the third planetary gear set PS3 is designed as a downshift gear set and is arranged in the power flow between the second web shaft ST2 and the output shaft Ab in order to increase the final transmission ratio of the manual gearbox SG. Furthermore, the third planetary gear set PS3 is arranged completely radially within the electric machine EM. In other words, the electric machine EM and the third planetary gear set PS3 are nested radially, which makes the drive unit axially more compact. Otherwise, the exemplary embodiment according to FIG. 8 corresponds to the exemplary embodiment according to FIG. 7, to which reference is made.

Figure 9:
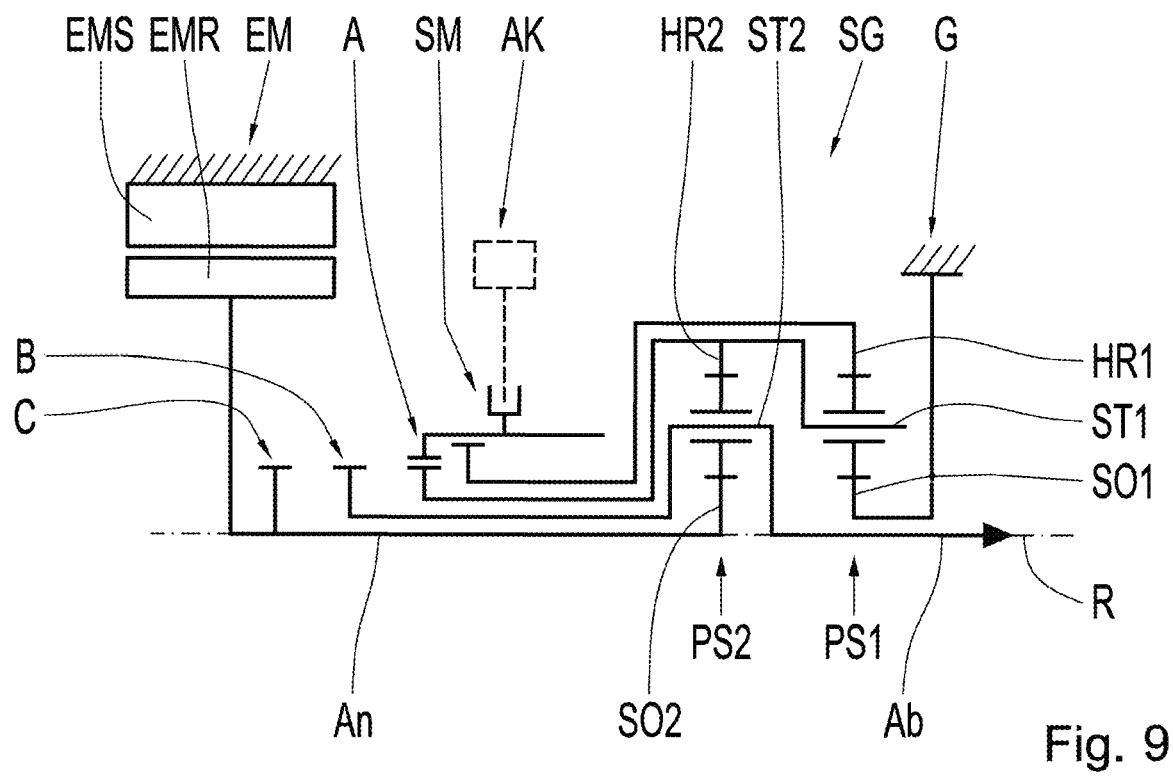
FIG. 9: a highly abstract schematic view of a drive unit according to the invention according to an eighth embodiment.

FIG. 9 shows an eighth embodiment of a drive unit according to the invention. The drive unit according to FIG. 9 essentially corresponds to the drive unit according to FIG. 2, wherein one difference between these two embodiments is the reduction in the diameter of the shift unit. In the present case, the shift elements A, B, C of the shift unit are arranged on a smaller diameter than in the exemplary embodiment according to FIG. 2. As a result, the shift elements A, B, C can be designed to be more compact and less expensive. Furthermore, part of the shift unit, in particular half of it, is arranged radially within the electric machine EM. This allows the drive unit to be designed to be axially more compact. Otherwise, the exemplary embodiment according to FIG. 9 corresponds to the exemplary embodiment according to FIG. 2, to which reference is made.

Figure 10:
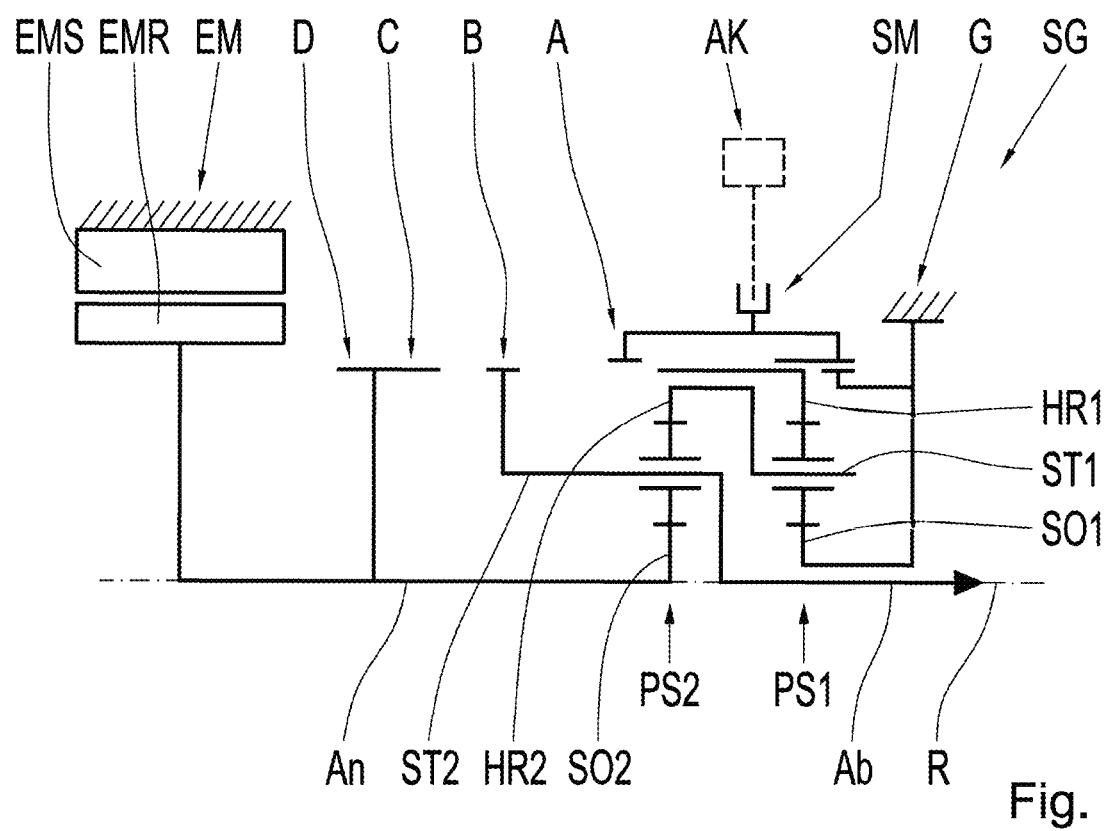
FIG. 10: a highly abstract schematic view of a drive unit according to the invention according to a ninth embodiment.

FIG. 10 shows a ninth embodiment of a drive unit according to the invention. The drive unit according to FIG. 10 essentially corresponds to the drive unit according to FIG. 3, wherein one difference between these two embodiments is the arrangement of a further shift element for forming a fourth gear. In the present case, the manual gearbox SG has not only the first, second and third shift elements A, B, C, but also a fourth shift element D. All shift elements A, B, C, D are designed as interlocking shift elements. The first shift element A, the second shift element B, the third shift element C and the fourth shift element D form a shift unit with seven shift positions, wherein the shift unit has a single axially movable sliding sleeve SM, with which the seven shift positions are realized. The sliding sleeve SM is axially movable into the respective shift position by means of a single actuator AK. Consequently, the seven shift positions of the shift unit are arranged linearly and are composed of four gear positions and three neutral positions, wherein the shift unit has exactly one neutral position between two gear positions. Gears one to four are therefore shifted one after the other or sequentially by moving the sliding sleeve SM in an axial direction, in each case via neutral positions. This not only saves weight and components, but also costs, installation space, and assembly work. Shift positions one to five and the function remain unchanged compared to the embodiment shown in FIG. 3. The first shift position of the sliding sleeve SM is shown in FIG. 10.

The third gear is selected by moving the sliding sleeve SM axially into a third neutral position, i.e., into the sixth shift position. In the sixth shift position of the sliding sleeve SM, the first hollow gear shaft HR1 and the second sun shaft SO2 have no rotationally fixed connection to each other via the sliding sleeve SM and are thus decoupled from one another via the sliding sleeve SM. In the third neutral position, the sliding sleeve SM is in rotary engagement with the second sun shaft SO2.

Fourth gear is engaged by moving the sliding sleeve SM axially into a fourth gear position, i.e., into a seventh shift position. In an actuated state, i.e., in the seventh shift position of the sliding sleeve SM, the fourth shift element D connects the second web shaft ST2 with the second sun shaft SO2. This blocks the second planetary gear set PS2 and creates a direct gear with the transmission ratio 1, which is connected to the transmission ratio series. Otherwise, the exemplary embodiment according to FIG. 10 corresponds to the exemplary embodiment according to FIG. 3, to which reference is made.

Figure 11:
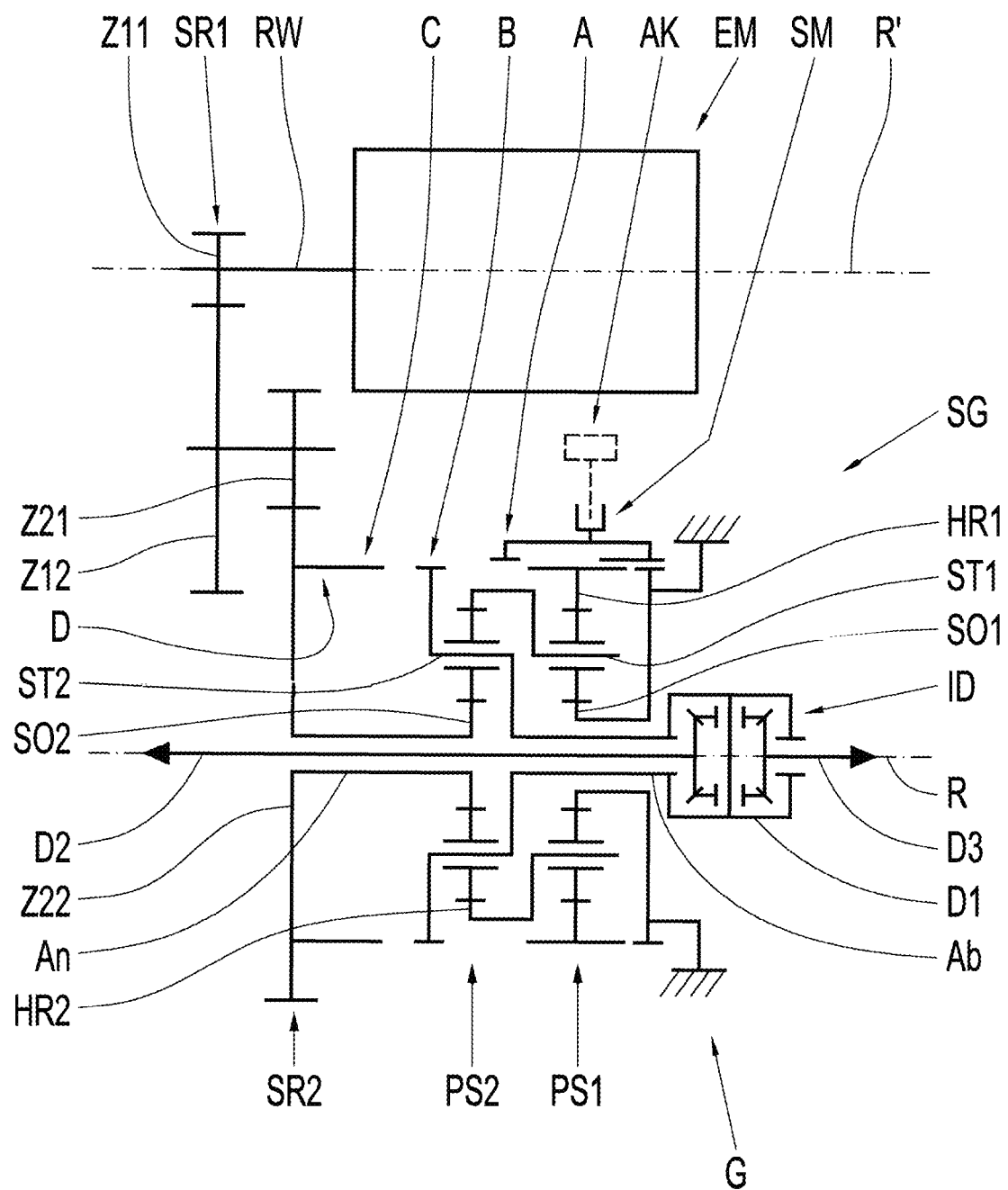
FIG. 11: a highly abstract schematic view of a drive unit according to the invention according to a tenth embodiment.

FIG. 11 shows a tenth embodiment of a drive unit according to the invention. The drive unit according to FIG. 11 essentially corresponds to the drive unit according to FIG. 10, wherein one difference between these two embodiments is the arrangement of the electric machine EM, two spur gear stages SR1, SR2 for forming a pre-transmission ratio and a differential ID. In the present case, the electric machine EM is arranged axially parallel to the manual gearbox SG and is connected to the manual gearbox SG via the two spur gear stages SR1, SR2 with an actuating effect. Consequently, the electric machine EM is arranged on an axis R' which is designed parallel to the axis of symmetry R on which the manual gearbox SG is arranged. A rotor shaft RW is connected to the rotor of the electric machine EM, which is not shown in detail, in a rotationally fixed manner. The first spur gear stage SR1 has a first gear wheel Z11 and a second gear wheel Z12, which engage in a tooth mesh with one another. The first gear wheel Z11 of the first spur gear stage SR1 is connected to the rotor shaft RW in a rotationally fixed manner. The second gear wheel Z12 of the first spur gear stage SR1 is arranged axially parallel between the axis of symmetry R and the axis R'. The second spur gear stage SR2 has a first gear wheel Z21 and a second gear wheel Z22, which engage in a tooth mesh with one another. The first gear wheel Z21 of the second spur gear stage SR2 is connected to the second gear wheel Z12 of the first spur gear stage SR1 in a rotationally fixed manner. The second gear wheel Z22 of the second spur gear stage SR2 is connected to the drive shaft An in a rotationally fixed manner. The two spur gear stages SR1, SR2 not only generate an additional transmission ratio for the electric machine EM, but also set the center distance between the manual gearbox SG and the electric machine EM, i.e., between the axis of symmetry R and the axis R', as required. The two spur gear stages SR1, SR2 can also be added in the exemplary embodiments shown in FIGS. 2 to 9, so that the electric machine EM is then formed with its axis parallel to the manual gearbox SG.

The differential ID is designed as a bevel gear differential and is arranged in the power flow downstream of the manual gearbox SG. The bevel gear differential has a first output gear and a second output gear. The two output gears each mesh with a balancing element. The balancing elements are mounted in a differential cage so that they can rotate about their own axis. The respective output gear is connected to a respective differential output shaft D2, D3 in a rotationally fixed manner. The differential is driven via the differential cage, which is configured as a differential input shaft D1. The differential input shaft D1 is connected to the output shaft Ab in a rotationally fixed manner. The drive power fed into the differential ID is distributed to the differential output shafts D2. D3 and transmitted to the drive gears of the axle. The differential output shafts D2, D3 are configured to be connected to the drive gears of the vehicle with an actuating effect, wherein this is indicated by a respective arrow. The respective differential output shaft D2, D3 can be connected directly or directly or indirectly or indirectly via a joint, a joint shaft and/or a wheel hub to the associated vehicle wheel. The differential ID is arranged coaxially to the manual gearbox SG, wherein the first differential output shaft D2 extends axially through the entire manual gearbox SG. Otherwise, the exemplary embodiment according to FIG. 10 corresponds to the exemplary embodiment according to FIG. 3, to which reference is made.

Figure 12:
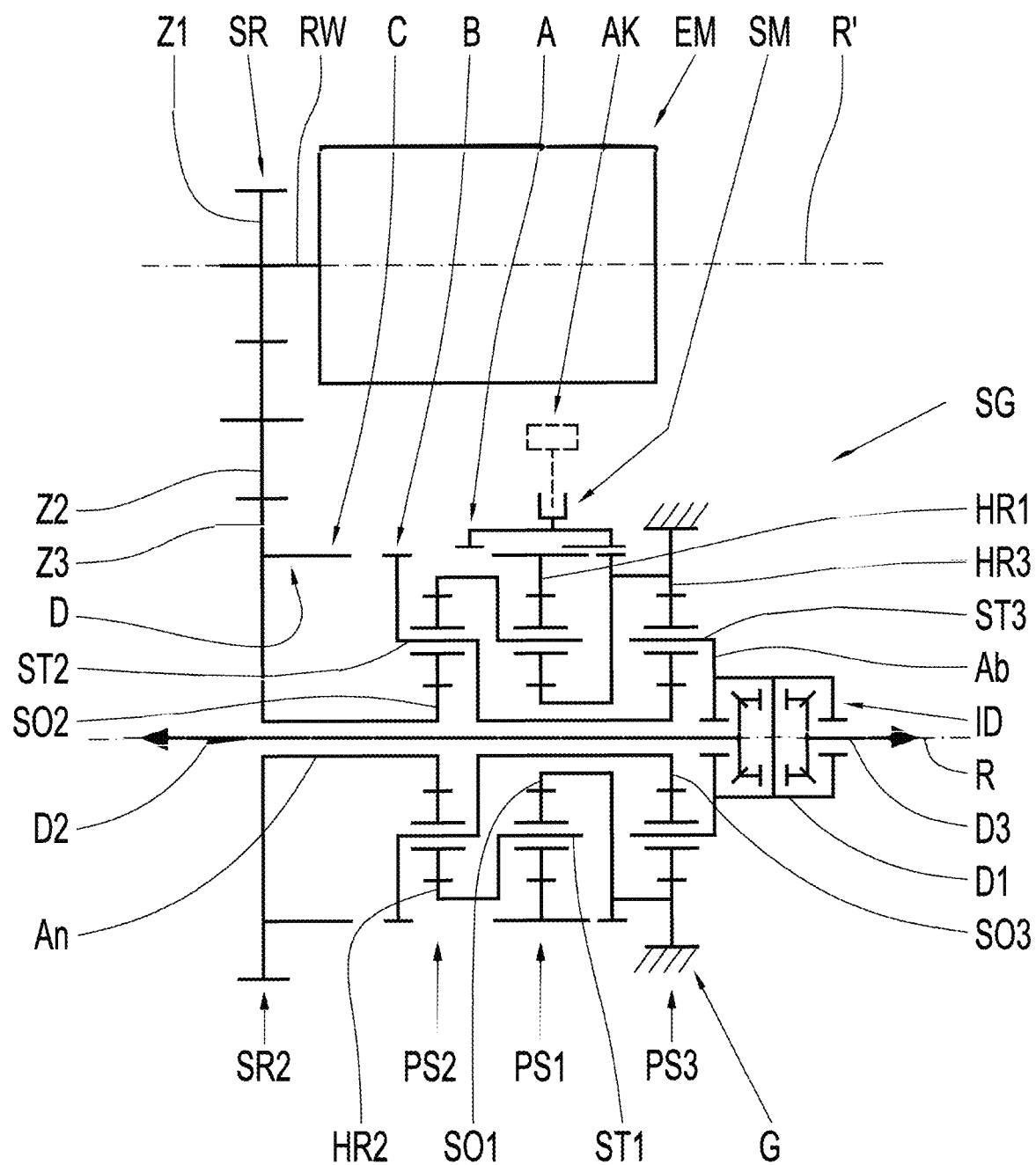
FIG. 12: a highly abstract schematic view of a drive unit according to the invention according to an eleventh embodiment.

FIG. 12 shows an eleventh embodiment of a drive unit according to the invention. The drive unit according to FIG. 12 essentially corresponds to the drive unit according to FIG. 10, wherein one difference between these two embodiments consists in the arrangement of the electric machine EM, a spur gear stage SR for forming a pre-transmission ratio, a third planetary gear set PS3 for forming a constant transmission ratio and a differential ID. In the present case, the electric machine EM is arranged axially parallel to the manual gearbox SG and is connected to the manual gearbox SG via the spur gear stage SR with an actuating effect. Consequently, the electric machine EM is arranged on an axis R' which is designed parallel to the axis of symmetry R on which the manual gearbox SG is arranged. A rotor shaft RW is connected to the rotor of the electric machine EM, which is not shown in detail, in a rotationally fixed manner. The spur gear stage SR has a first gear wheel Z1, a second gear wheel Z2 and a third gear wheel Z3, wherein the second gear wheel Z2 is designed as an intermediate gear and is in tooth mesh with both the first gear wheel Z1 and the third gear wheel Z3. The first gear wheel Z1 of the spur gear stage SR is connected to the rotor shaft RW in a rotationally fixed manner. The second gear wheel Z2 of the spur gear stage SR is arranged parallel to the axis between the axis of symmetry R and the axis R'. The third gear wheel Z3 of the spur gear stage SR is connected to the drive shaft An in a rotationally fixed manner. The spur gear stage SR not only generates an additional transmission ratio for the electric machine EM, but also adjusts the center distance between the manual gearbox SG and the electric machine EM, i.e., between the axis of symmetry R and the axis R', as required. The spur gear stage SR can also be added in the exemplary embodiments shown in FIGS. 2 to 9, so that the electric machine EM is then formed with its axis parallel to the manual gearbox SG.

The third planetary gear set PS3 is designed as a constant transmission stage and comprises a third sun shaft SO3, a third hollow gear shaft HR3 and a third web shaft ST3. The third web shaft ST3 carries multiple planetary gears which mesh with the third sun shaft SO3 and with the third hollow gear shaft HR3. The third hollow gear shaft HR3 is connected to a stationary component in the form of a housing G in a rotationally fixed manner and is thus prevented from rotating. The third sun shaft SO3 is connected to the second web shaft ST2 in a rotationally fixed manner, wherein the third web shaft ST3 is connected to the output shaft Ab in a rotationally fixed manner. Consequently, the third planetary gear set PS3 is designed as a downshift gear set and is arranged in the power flow between the second web shaft ST2 and the output shaft Ab in order to increase the final transmission ratio of the manual gearbox SG. The third planetary gear set PS3 increases the overall transmission ratio without loading the manual gearbox SG with increased torque.

The differential ID is designed as a bevel gear differential and is arranged in the power flow after the third planetary gear set PS3. The bevel gear differential has a first output gear and a second output gear. The two output gears each mesh with a balancing element. The balancing elements are mounted in a differential cage so that they can rotate about their own axis. The respective output gear is connected to a respective differential output shaft D2, D3 in a rotationally fixed manner. The differential is driven via the differential cage, which is configured as a differential input shaft D1. The differential input shaft D1 is connected to the output shaft Ab in a rotationally fixed manner. The drive power fed into the differential ID is distributed to the differential output shafts D2, D3 and transmitted to the drive gears of the axle. The differential output shafts D2, D3 are configured to be connected to the drive gears of the vehicle with an actuating effect, wherein this is indicated by a respective arrow. The respective differential output shaft D2, D3 can be connected directly or directly or indirectly or indirectly via a joint, a joint shaft and/or a wheel hub to the associated vehicle wheel. The differential ID is arranged coaxially to the manual gearbox SG, wherein the first differential output shaft D2 extends axially through the entire manual gearbox SG. Otherwise, the exemplary embodiment according to FIG. 10 corresponds to the exemplary embodiment according to FIG. 3, to which reference is made.

LIST OF REFERENCE NUMERALS

An Drive shaft
Ab Output shaft
SG Manual gearbox
100 Vehicle
101 First axis
102 Second axis
R1 Vehicle wheel
R2 Vehicle wheel
R3 Vehicle wheel
R4 Vehicle wheel
EM Electric machine
EMS Stator
EMR Rotor
PS1 First planetary gear set SO1 First sun shaft
HO1 First hollow gear shaft
ST1 First web shaft
PS2 Second planetary gear set
SO2 Second sun shaft
HO2 Second hollow gear shaft
ST2 Second web shaft
PS3 Third planetary gear set
SO3 Third sun shaft
HO3 Third hollow gear shaft
ST3 Third web shaft
SM Sliding sleeve
A First shift element
B Second shift element
C Third shift element
D Fourth shift element
AK Actuator
G Housing
R Axis of symmetry
R' Axis
ID Differential
D1 Differential input shaft
D2 First differential output shaft
D3 Second differential output shaft
30 First planetary gear set
31 Sun gear of the first planetary gear set
32 Ring gear of the first planetary gear set
33 Web shaft of the first planetary gear set
40 Second planetary gear set
41 Sun gear of the second planetary gear set
42 Ring gear of the second planetary gear set
43 Web shaft of the second planetary gear set
SR1 First spur gear stage
Z11 First gear wheel
Z12 Second gear wheel
SR2 Second spur gear stage
Z21 First gear wheel
Z22 Second gear wheel
SR Spur gear stage
Z1 First gear wheel
Z2 Second gear wheel
Z3 Second gear wheel
RW Rotor shaft

The invention claimed is:
1. A drive unit for a vehicle, comprising:
an electric machine; and
a manual gearbox with at least a first shift element, a second shift element, a third shift element, and two planetary gear sets coupled to one another;
wherein:
the first planetary gear set has a first sun shaft, a first hollow gear shaft, and a first web shaft;
the second planetary set comprises a second sun shaft, a second hollow gear shaft, and a second web shaft;
the second sun shaft is actuatable by the electric machine;
the second hollow gear shaft is connected to the first web shaft in a rotationally fixed manner;
the first sun shaft is connected to a stationary component in a rotationally fixed manner
the first shift element, in an actuated state, locks the first planetary gear set in order to shift a first gear;
the first element, in the actuated state, connects the first hollow gear shaft to the first web shaft in a rotationally fixed manner in order to shift the first gear;
the second shift element, in an actuated state, connects the first hollow gear shaft to the second web shaft in a rotationally fixed manner in order to shift a second gear; and
the third shift element, in an actuated state, connects the first hollow gear shaft to the second sun shaft in a rotationally fixed manner in order to shift a third gear.

2. The drive unit for a vehicle according to claim 1, wherein the second web shaft is configured as the output of the manual gearbox.

3. The drive unit for a vehicle according to claim 1, wherein the manual gearbox has a fourth shift element.

4. The drive unit according to claim 3, comprising a sliding sleeve arranged on the first hollow gear shaft in a rotationally fixed manner.

5. The drive unit according to claim 1, wherein the first shift element, the second shift element, and the third shift element are combined to form a shift unit with five shift positions, and wherein the shift unit has a single sliding sleeve which is axially movable.

6. The drive unit according to claim 1, wherein all shift elements are configured as interlocking shift elements.

7. The drive unit according to claim 1, further comprising:
a differential with a differential input shaft connected to the second web shaft; and
two differential output shafts.

8. The drive unit according to claim 7, wherein the differential is configured as an integral differential with a first planetary gear set and a second planetary gear set.

9. The drive unit according to claim 1, further having a third planetary gear set configured as a constant transmission stage with a third sun shaft, a third hollow gear shaft, and a third web shaft.

10. The drive unit according to claim 9, wherein the third planetary gear set is arranged at least partially radially within the electric machine.

11. A vehicle comprising at least one drive unit according to claim 1.

12. A drive unit for a vehicle, comprising:
an electric machine; and
a manual gearbox with at least a first shift element, a second shift element, a third shift element, and two planetary gear sets coupled to one another;
wherein:
the first planetary gear set has a first sun shaft, a first hollow gear shaft, and a first web shaft;
the second planetary set comprises a second sun shaft, a second hollow gear shaft, and a second web shaft;
the second sun shaft is actuatable by the electric machine;
the second hollow gear shaft is connected to the first web shaft in a rotationally fixed manner;
the first sun shaft is connected to a stationary component in a rotationally fixed manner
the first shift element, in an actuated state, locks the first planetary gear set in order to shift a first gear;
the second shift element, in an actuated state, connects the first hollow gear shaft to the second web shaft in a rotationally fixed manner in order to shift a second gear; and
the third shift element, in an actuated state, connects the first hollow gear shaft to the second sun shaft in a rotationally fixed manner in order to shift a third gear; and
wherein the first shift element, in the actuated state, connects the first hollow gear shaft to the stationary component in a rotationally fixed manner in order to shift the first gear.

13. A drive unit for a vehicle, comprising:
an electric machine; and
a manual gearbox with at least a first shift element, a second shift element, a third shift element, a fourth shift element, and two planetary gear sets coupled to one another;
wherein:
   the first planetary gear set has a first sun shaft, a first hollow gear shaft, and a first web shaft;
   the second planetary set comprises a second sun shaft, a second hollow gear shaft, and a second web shaft;
   the second sun shaft is actuatable by the electric machine;
   the second hollow gear shaft is connected to the first web shaft in a rotationally fixed manner;
   the first sun shaft is connected to a stationary component in a rotationally fixed manner
      the first shift element, in an actuated state, locks the first planetary gear set in order to shift a first gear;
      the first element, in the actuated state, connects the first hollow gear shaft to the first web shaft in a rotationally fixed manner in order to shift the first gear;
      the second shift element, in an actuated state, connects the first hollow gear shaft to the second web shaft in a rotationally fixed manner in order to shift a second gear; and
      the third shift element, in an actuated state, connects the first hollow gear shaft to the second sun shaft in a rotationally fixed manner in order to shift a third gear; and
   wherein the fourth shift element, in an actuated state, connects the first web shaft to the second sun shaft in a rotationally fixed manner in order to shift a fourth gear.

14. The drive unit according to claim 13, wherein the first shift element, the second shift element, the third shift element, and the fourth shift element form a shift unit with seven shift positions, and wherein the shift unit has a single sliding sleeve which is axially movable.

15. The drive unit according to claim 14, wherein the shift unit comprises a neutral position between two gear positions of the seven shift positions.

16. The drive unit according to claim 15, wherein the shift unit is arranged at least partially radially within the electric machine.

* * * * *